May 21, 1957 C. C. ADAMS 2,792,717
LOCK FOR GEAR SHIFTING MECHANISMS
Filed March 26, 1954 2 Sheets-Sheet 2

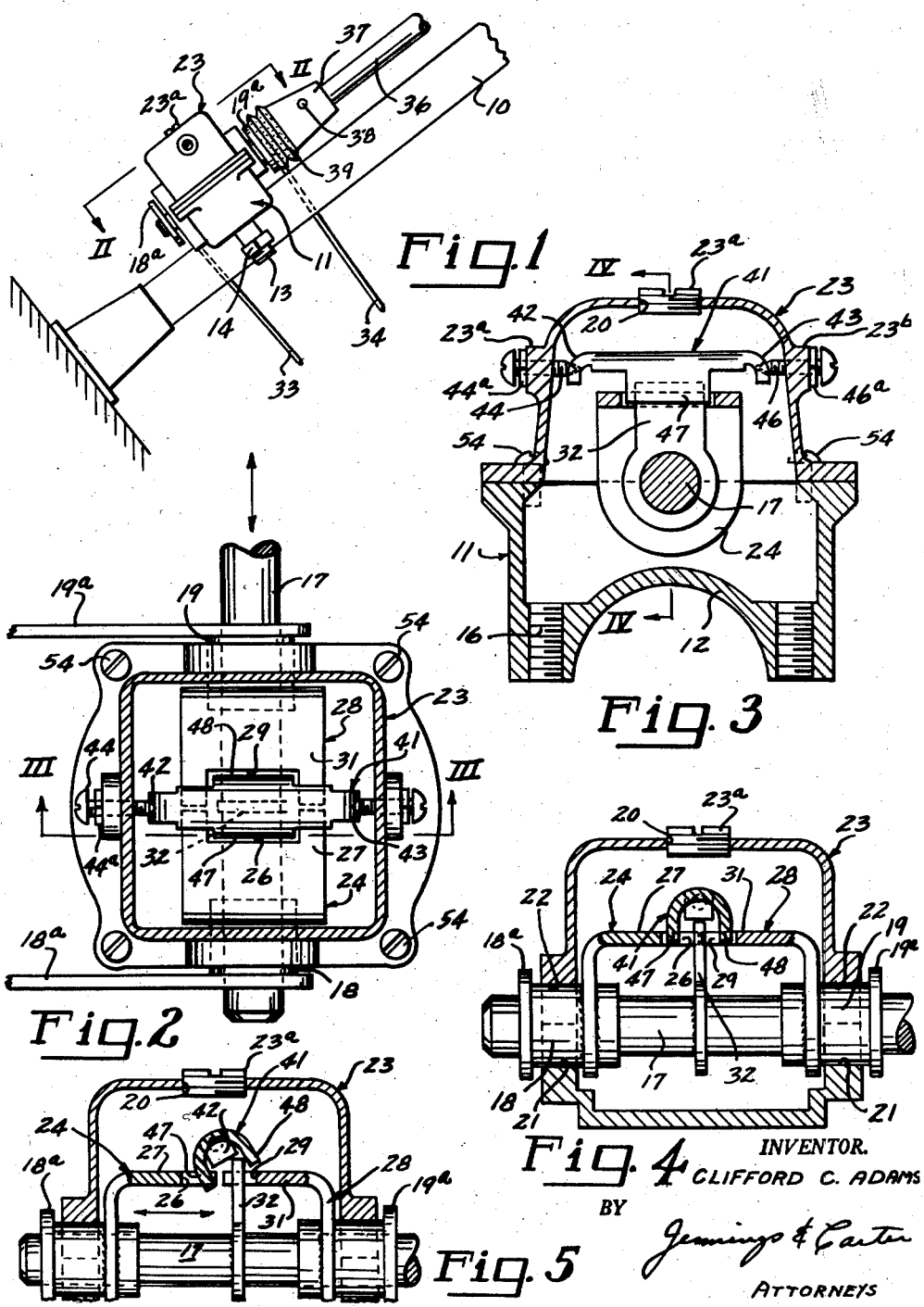

INVENTOR.
CLIFFORD C. ADAMS
BY
*Jennings & Carter*
ATTORNEYS

United States Patent Office 2,792,717
Patented May 21, 1957

2,792,717

LOCK FOR GEAR SHIFTING MECHANISMS

Clifford C. Adams, Birmingham, Ala.

Application March 26, 1954, Serial No. 418,927

4 Claims. (Cl. 74—477)

My invention relates to automatic lock means for automotive gear shifting mechanisms, and while not limited thereto is particularly adapted for use with certain selector mechanisms interposed between the usual manually operated gear shifting lever, mounted inside the vehicle beneath the steering wheel, and the transmission proper.

In certain automobile gear shifting mechanisms the transmission speed change and reverse gears are shifted through a selector mechanism controlled by the usual hand shift lever. In the type of shift mechanism in question, the second and high gear selection is under immediate control of one lever projecting from the selector mechanism, while the low and reverse gear selection is under control of a second similar lever projecting from the selector mechanism. The two levers mentioned are disposed to be oscillated in selective manner through an axially movable and oscillatable selector shaft, shiftable and oscillatable directly by the hand shift lever. After a period of use certain internal parts of the transmission become worn and this permits accidental shifting and misalignment of the actuator rod, misaligning the selector mechanism, and rendering the entire system inoperative to shift the gears in proper manner.

In view of the foregoing the prime object of my invention is to provide, in a selector mechanism, means automatically operable to lock against displacement one of said shift levers whenever the other thereof is under control of the selector shaft, whereby, at any given time the unused or idle lever is locked against oscillation, preventing misalignment of the gears.

Another object is to provide apparatus of the character designated in which the locking means embodies an oscillatable member which is rocked from side to side by a member on the selector shaft upon axial movement of said shaft, the rocking movement being effective to unlock the shift lever toward which the member on the selector shaft moves and simultaneously effective to lock the other shift lever.

My invention contemplates the combination with a pair of slotted brackets, each fast on its own shifter lever, and an axially movable selector lug movable selectively into the slots of the brackets and then oscillatable to oscillate the engaged bracket, of an oscillatable locking member having ears or lugs on either side of the selector lug, whereby when the lug moves into the slot of one bracket the ear associated with that bracket is withdrawn from its slot and the other ear engages in the slot of the opposite bracket.

My invention further contemplates apparatus of the character designated which may be applied to existing selector mechanisms either by inserting the same in the lubrication opening of the existing cover for such mechanisms or by incorporating it in a slightly redesigned cover, thus making my invention readily adaptable to existing selectors without major change therein.

Apparatus illustrating the features of my invention is shown in the accompanying drawings forming a part of this application in which:

Fig. 1 is a side elevational view, partly broken away and in section, showing my invention mounted on the lower end of the steering column of the usual automobile and with the shift rod leading to the manually operable shift lever broken away;

Fig. 2 is an enlarged detail sectional view taken generally along line II—II of Fig. 1;

Fig. 3 is a sectional view taken generally along line III—III of Fig. 2;

Fig. 4 is a detail sectional view taken generally along line IV—IV of Fig. 3;

Fig. 5 is a fragmental detail sectional view corresponding to Fig. 4 and showing the selector shifted to a position to lock the left hand one of the shifting levers;

Figure 6:
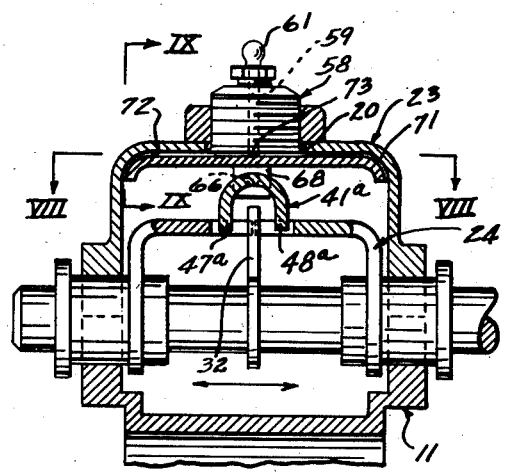
Fig. 6 is a sectional view corresponding to Fig. 4 and showing a slightly modified form of my invention.

Referring now to the drawings for a better understanding of my invention and more particularly to Figs. 1 to 5 inclusive, I show my improved selector mechanism associated with the lower end of a steering column 10 found in the usual automobile. As illustrated, the selector mechanism with which my invention is associated comprises a lower housing section 11 having a seat 12 therein which is disposed to fit about the steering column 10. A strap 13 fits about the other side of the steering column and bolts 14 fit into threaded openings 16 in the section 11 to secure the device in place.

In the manner well understood, the selector mechanism may embody a selector shaft 17. The shaft 17 is slidably and oscillatably mounted in bushings 18 and 19. Fixedly secured to the outer ends of the bushings are shifter arms 18a and 19a, respectively. The bushings fit rotatably in half bearings 21 formed in the upper edges of the lower housing section 11 and half bearings 22 in the lower edges of an upper housing section or cap indicated generally by the numeral 23. The cover may have a lubrication opening 20 in its top closed by a plug 23a.

Secured non-rotatably to the bushing 18 is a bracket 24 having a U-shaped slot 26 in an inturned section 27 thereof. In similar manner, secured non-rotatably to the bushing 19 is a bracket 28 having a U-shaped slot 29 in an inturned section 31 thereof. As shown in the drawing, the slotted ends of the brackets are disposed closely adjacent each other.

Non-rotatably mounted on the shaft 17 is a selector lug 32 which is adapted, upon axial movement of the shaft 17 to enter selectively into the slots 26 or 29. Thereafter, upon oscillation of the shaft 17 in the manner understood, lug 32 engages the bracket 24 or 28, oscillating the bracket and the shifter arm 18a or 19a as the case may be. Also, and as is understood, the oscillation of the arms is effective, through connecting links 33 and 34, respectively, to shift the gears. The arm 18a and its link 33 may control the high and second gears of the transmission, whereas the arm 19a and its link 34 may control the low and reverse gears.

The projecting end of the shaft 17 may be made fast to an axially movable and rotatable rod 36 which is connected in the manner understood to the usual hand shift lever, not shown, located immediately beneath the steering wheel of the vehicle. The connection may be by means of a sleeve 37 fast on the lower end of rod 36. A pin 38 passes through the sleeve and a slot, not shown, in the surface of the shaft 17, securing together the shaft and rod. If desired, a protective rubber sleeve 39 may be provided to exclude dirt from the connection.

The device so far described, is, to large extent, standard on some present day automobiles and is shown generally in Patent 2,180,579, dated November 21, 1939, issued to Orville K. Butzbach. Also, the mechanism so far described is shown generally again in Thompson Patent 2,661,630 dated December 8, 1953.

My invention consists of means to prevent oscillation of one of the brackets 24 or 28 while the other thereof is being oscillated by selected lug 32, thereby assuring that the shifting lever 18a or 19a remains fixed and stationary while the other thereof is being oscillated to select the gears. As shown in Figs. 2 to 5, inclusive, I provide an oscillatable lock member indicated generally by the numeral 41. The member may comprise a strip of sheet material bent over at the ends as indicated at 42 and 43 and supported on said bent over ends by means of screws 44 and 46, pins, a small shaft or the like. The screws may have conical ends which fit in conical seats in the bent over portions 42 and 43 as indicated. The cap 23 may have thickened tapped pads 23b to receive the screws 44 and 46. Lock nuts 44a and 46a serve to maintain adjustment of the bearing screws. Intermediate its ends the locking member 41 is provided with lugs 47 and 48 of a width and length, when rocked as indicated in Fig. 5, to enter into slots 26 or 29 of the bracket portions 27 and 31. Furthermore, the depending lugs 47 and 48 receive between them the upper end of the lug 32 so that when shaft 17 moves axially lug 32 rocks the locking member 41. This releases the lug 47 or 48 from the slot into which the lug 32 moves and places the other lug 47 or 48 in the slot of the other bracket. As is known, oscillation of the arms 18a and 19a is limited to a few degrees by internal parts of the transmission under control of the links 33 and 34. Thus, throughout the entire rotating range of the shaft 17 there is no danger of the lug 32 rocking past the ends of the locking lugs 47 and 48 and engaging against the ends of the lugs.

From the description so far given it will be apparent that with the parts in the position of Figs. 2 and 4, when the rod 36 is pulled upwardly lug 32 moves into the slot 29 in the end 31 of bracket 28. Simultaneously with this movement the depending locking lug 48 of member 41 is withdrawn from the slot 29 and lug 47 is positioned in slot 26 of the portion 27 of bracket 24. This latter action locks the bushing 18 and hence arm 18a against oscillation and permits lug 32, upon oscillation of shaft 17, to rock bushing 19 and its integrally carried arm 19a, thus making the selection as determined by the direction of oscillation of the shaft 36. During the time that arm 19a is engaged by the lug 32, arm 18a is held locked against oscillation to any appreciable extent.

It will also be noted that the cover 23 is secured on the base portion 11 by screws 54. In adapting my invention to existing devices of this type I may provide a new cover 23 to fit the old base portion 11, my improved locking member 41, the screws 44 and 46 being assembled in the new cover 23.

Figure 7:
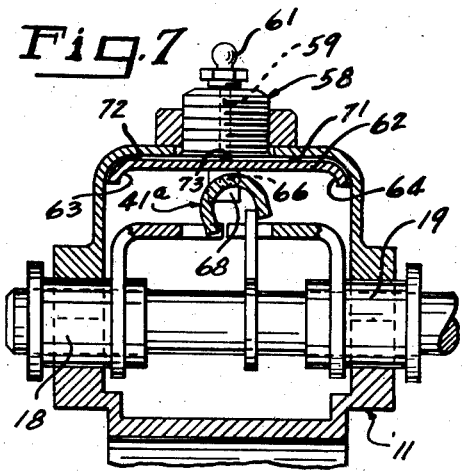
Fig. 7 is a view corresponding generally to Fig. 5 and showing the form of invention shown in Fig. 6 moved to a position to lock the left hand one of the shifting levers.
Figure 9:
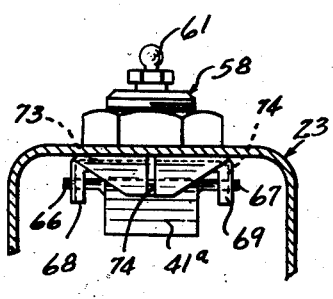
Fig. 9 is a view taken generally along line IX—IX of Fig. 6.
Figure 8:
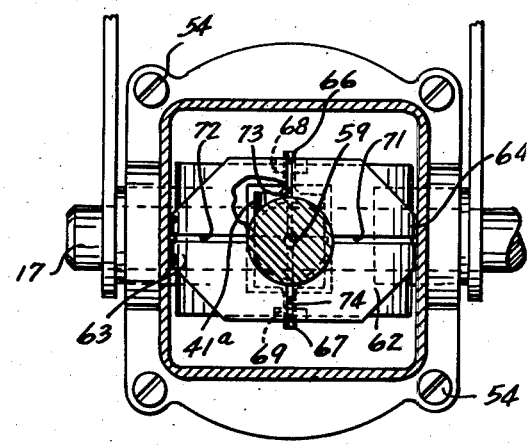
Fig. 8 is a sectional view taken generally along line VIII—VIII of Fig. 6.

Referring now to Figs. 6 to 9, inclusive, I show a slightly modified form of my invention. In this instance the cap 23 which initially is furnished with the unit, or one substantially identical thereto, and having the lubrication hole 23a in the top thereof is employed. Disposed to project upwardly through the hole 20 is a threaded stem 58 which has a centrally disposed lubricant passage 59 therein. A pressure grease fitting 61 is screwed into the top of the portion 58 and communicates with the opening 59.

Formed on the lower end of the member 58, preferably integrally therewith is a plate-like section 62 which has downturned end portions 63 and 64 which fit into the curved portion of the inside surface of the cap. The oscillatable locking member 41a is substantially identical to the one already described and may have pintles 66 and 67 which fit respectively in depending brackets 68 and 69 carried by the plate portion 62. The depending lugs or locking portions 47a and 48a of the member 41a straddle the upstanding lug 32 and are disposed to co-act with the brackets 24 and 28 in the manner already explained.

An important feature of the modified form of my invention lies in the provision of means positively to grease the rotatable bushings 18 and 19 and the pintles 66 and 67. To this end I provide half round grease passages 71 and 72 which connect with the vertically disposed passage 59 and lead outwardly from the passage 59 to a point immediately over the center line of the shaft 17, directly over the bushings. In similar manner I provide laterally directed half round grease passages or grooves 73 and 74 in the plate section 62 which lead outwardly to discharge directly over the ends of the pintles 66 and 69. Therefore, with the whole unit in place in the cap the under surface of the cap co-acts with the half round grooves to form complete lubricant passages. When grease under pressure is applied to the passage 59 through the fitting 61 the several grooves conduct the grease to the bushings 18 and 19 and to the pintles 66 and 67.

The modified device being described functions identically as does the one already described in connection with Figs. 2 to 5, inclusive. However, the modified device may be installed in existing caps 23 as the same are presently supplied as a part of the unit in question or a cap very similar thereto. The cap is held in place by the screws 54 as already explained.

From the foregoing it will be apparent that with either modification of my invention I have provided an economical, positive acting automatic lock for gear selector mechanisms. The oscillating or rocking lock member 41 or 41a is automatically responsive to lock against rotation the idle one of the brackets and hence the idle one of the arms 18a or 19a. Further, when lug 32 is in neutral position it will be seen that the depending locking lug portions 47 and 48 or 47a and 48a fit in the slotted ends of both of the brackets and hold them both against rotation. At all events, it will be apparent that I have provided an improved automatic lock for devices of the type disclosed which is fully effective for its intended purposes.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. The combination with gear selector mechanism of the type having a housing with an axially movable and oscillatable shaft therein together with slotted shifter arm brackets selectively engageable by an actuator lug fast on the shaft when the shaft moves axially, of a locking member having locking lugs spaced on either side of the actuator lug and disposed to enter the slots of the shifter arm brackets, bearing screws in threaded engagement with said housing and engaging opposite ends of said locking member thus mounting the locking member for rocking movement about an axis generally at right angles to the longitudinal axis of said shaft thereby to position the locking lugs selectively in the slots, and lock nuts on said bearing screws maintaining the screws in selected positions whereby the locking member can be adjusted laterally of the longitudinal axis of said shaft.

2. The combination with gear selector means of the type having a housing with an axially movable and oscillatable shaft therein together with slotted shifter arm brackets journalled in the housing and selectively engageable by an actuator lug fast on the shaft upon axial movement of the shaft, of a locking member having locking lugs spaced on either side of the actuator lug and disposed to enter the slots of the shifter arm brackets, bearing screws in threaded engagement with said housing and engaging opposite ends of the locking member whereby the locking member is mounted for oscillation in a plane substantially normal to the longitudinal axis of the shaft, lock nuts on said bearing screws maintaining the screws in selected positions whereby the locking member can be adjusted laterally of the longitudinal axis of said shaft the actuating lug projecting between said locking lugs sufficiently to engage the same thereby to rock said locking member, there being a grease passage leading from outside the housing to the journals of the shifter arm brackets and to the journals of the locking member, and a grease fitting in said passage accessible from outside said housing for injecting grease into said passages.

3. A locking mechanism especially adapted for selectively holding one of two movable members against oscillation, a threaded body portion disposed to be secured to a housing by a nut, a generally flat plate-like portion fast on the inner end of the threaded body portion, an oscillatable locking member, bearings on the plate-like portion mounting said locking member for oscillation, depending spaced lugs on the locking member engageable in slective manner with the movable members upon oscillation of the locking member, means to oscillate the locking member, there being grease passages leading through the threaded body portion and thence to the bearings of said locking member, and means on the outer end of said body portion for introducing grease into the passage therein.

4. The combination with gear selector mechanism of the type having a housing with an axially movable and oscillatable shaft therein together with slotted shifter arm brackets selectively engageable by an actuator lug fast on the shaft when the shaft moves axially, of a locking member having locking lugs spaced on either side of the actuator lug and disposed to enter the slots of the shifter arm brackets, inwardly projecting bearing members operatively connected to said housing and engaging opposite ends of said locking member thus mounting the locking member for rocking movement about an axis generally at right angles to the longitudinal axis of said shaft thereby to position the locking lugs selectively in said slots, and means holding said locking member in a selected position laterally of the longitudinally axis of said shaft.

References Cited in the file of this patent

UNITED STATES PATENTS

| | | |
|---|---|---|
| 2,220,543 | Peterson | Nov. 5, 1940 |
| 2,231,742 | Witzke | Feb. 11, 1941 |
| 2,438,455 | Roeder | Mar. 23, 1948 |

FOREIGN PATENTS

| | | |
|---|---|---|
| 966,844 | France | Mar. 15, 1950 |